US011886548B2

(12) United States Patent
Khan et al.

(10) Patent No.: US 11,886,548 B2
(45) Date of Patent: Jan. 30, 2024

(54) SYSTEMS AND METHODS FOR DIGITAL ASSET MANAGEMENT

(71) Applicant: Verizon Patent and Licensing Inc., Basking Ridge, NJ (US)

(72) Inventors: Nazneen Khan, Alpharetta, GA (US); Dante J. Pacella, Charles Town, WV (US); Rea Setya, Arlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 405 days.

(21) Appl. No.: 17/367,102

(22) Filed: Jul. 2, 2021

(65) Prior Publication Data

US 2023/0004625 A1  Jan. 5, 2023

(51) Int. Cl.
*G06F 21/10* (2013.01)
*G06T 19/00* (2011.01)

(52) U.S. Cl.
CPC ............ *G06F 21/10* (2013.01); *G06T 19/006* (2013.01); *G06F 2221/2141* (2013.01)

(58) Field of Classification Search
CPC  G06F 21/10; G06F 2221/2141; G06T 19/006
USPC ......................................................... 726/26
See application file for complete search history.

(56) References Cited

U.S. PATENT DOCUMENTS

| 8,392,709 | B1* | 3/2013 | Agrawal | H04L 9/3228 |
| | | | | 713/169 |
| 11,075,891 | B1* | 7/2021 | Long | H04L 9/3213 |
| 11,308,487 | B1* | 4/2022 | Foster | G06Q 20/3829 |
| 11,663,551 | B2* | 5/2023 | Stephens | G06Q 10/087 |
| | | | | 705/28 |
| 11,682,015 | B2* | 6/2023 | Andon | G06T 11/001 |
| | | | | 705/65 |
| 2008/0270307 | A1* | 10/2008 | Olson | G06F 21/10 |
| | | | | 705/51 |
| 2021/0133700 | A1* | 5/2021 | Williams | G06Q 20/3678 |
| 2022/0058732 | A1* | 2/2022 | Reses | G06Q 20/065 |
| 2022/0222364 | A1* | 7/2022 | Roberts | G06F 21/64 |
| 2022/0300966 | A1* | 9/2022 | Andon | G06Q 20/3825 |
| 2022/0358186 | A1* | 11/2022 | Deuel | H04L 9/50 |
| 2023/0222187 | A1* | 7/2023 | Goldston | G06F 21/335 |
| | | | | 726/28 |

* cited by examiner

*Primary Examiner* — Samson B Lemma

(57) ABSTRACT

An exemplary method includes a digital asset management system generating a set of collectible non-fungible digital assets, generating metadata specifying that non-fungible digital assets included the set of collectible non-fungible digital assets are configured to combine together to form a layered scene configured to be presented by a computer system, and recording, in a distributed record configured to track ownership of non-fungible digital assets, ownership information associated with the set of collectible non-fungible digital assets.

17 Claims, 12 Drawing Sheets

```
Series
    {
     SeriesId: 1
     Type: "layered"
     PrimeTokenIDs: [PToken1, PToken2, PToken3]
    }

Tokens
    {
     PTokenId: PToken1
     Objects: objectA
    }
    {
     PTokenId: PToken2
     Objects: objectB
    }

{
     PTokenId: PToken3
     Objects: objectC
    }
```

Fig. 7

```
Objects
    {
      ObjectId: ObjectA
      Attributes: {
            "Layering": {
                    "type": 3D
                    "mapType": none, bump map, depth map
                    "level": 0, (base layer)
                    "dimensions": (w,l,h)
                    "snapPosition": [(x1,y1,z1),(x2,y2,z2),(x3,y3,z3)]
                    "Orientations": [(phi1,theta1),(phi2,theta2),(phi3,theta3)]
                    "Scale": [r1,r2,r3]
            }
      }
    {
      ObjectId: ObjectB
      Attributes: {
            "Layering": {
                    "type": 2D,
                    "level": 1,
                    "snapPosition": (20,20,0)
                    "Orientation": 45
                    "Scale": 1
            }
    }
      ObjectId: ObjectC
      Attributes: {
            "Layering": {
                    "type": 2D,
                    "level": 2,
                    "snapPosition": (40,40,0)
                    "Orientation": 30
                    "Scale": 2
            }
    }
```

```
Series
    {
    SeriesId: 1
    PrimeTokenIDs: [PToken1, PToken2, PToken3]
    "LayerType":"Layered",
     "Layering":{
            PToken1:{
                    "type":"2D",
                    "level":"0",
                    "orientation":"0",
                    "scale":"100",
                    "snapPosition":{
                      "x":"0",
                      "y":"0",
                      "z":"0"
                    }
            },
    },
            PToken2:{
                    "type":"2D",
                    "level":"1",
                    "orientation":"0",
                    "scale":"20",
                    "snapPosition":{
                      "x":"10",
                      "y":"20",
                      "z":"0"
                    }
            },
    },
            PToken2:{
                    "type":"2D",
                    "level":"2",
                    "orientation":"0",
                    "scale":"20",
                    "snapPosition":{
                      "x":"30",
                      "y":"50",
                      "z":"0"
                    }
            },
    },
```

SYSTEMS AND METHODS FOR DIGITAL ASSET MANAGEMENT

BACKGROUND INFORMATION

Advances in digital asset management have resulted in different types of digital assets that may be owned by users of computer systems. For example, a user of a computing device (e.g., a smartphone, a tablet computer, etc.) may acquire ownership of a non-fungible digital asset (e.g., a digital photograph, digital artwork, a meme, a video clip, an audio clip, etc.). Information associated with such ownership may be recorded in a distributed ledger (e.g., a blockchain) that certifies the non-fungible digital asset as being unique and that provides proof of ownership of the non-fungible digital asset.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 7-9 illustrate exemplary implementations of metadata according to principles described herein.

DETAILED DESCRIPTION OF PREFERRED EMBODIMENTS

Figure 1:
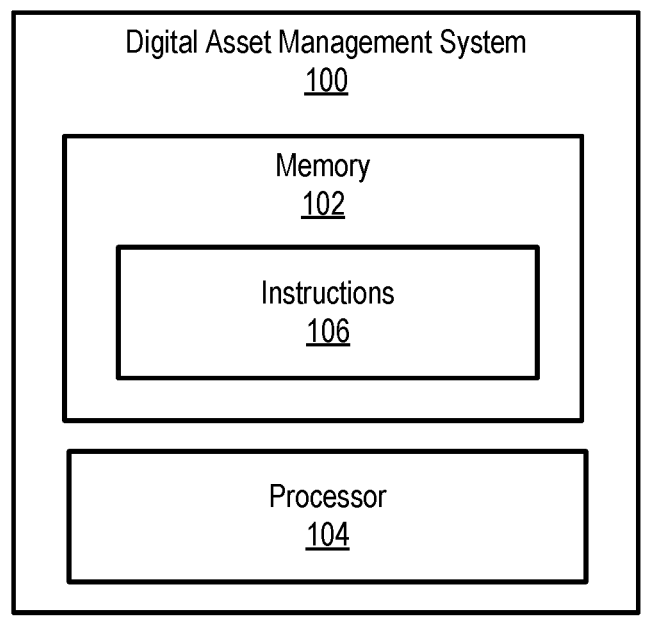
FIG. 1 illustrates an exemplary digital asset management system according to principles described herein.

Systems and methods for digital asset management are described herein. For example, an exemplary digital asset management system may perform one or more operations associated with a set of collectible non-fungible digital assets that, when combined together, form a layered scene.

In certain examples, for instance, an exemplary method may include generating, by a digital asset management system, a set of collectible non-fungible digital assets. The method may further include generating, by the digital asset management system, metadata specifying that non-fungible digital assets included the set of collectible non-fungible digital assets are configured to combine together to form a layered scene configured to be presented by a computer system. The method may further include recording, by the digital asset management system in a distributed record configured to track ownership of non-fungible digital assets, ownership information associated with the set of collectible non-fungible digital assets.

As used herein, a "non-fungible digital asset" may include any digital asset that is not interchangeable in terms of value and/or content with other digital assets. For example, a non-fungible digital asset may include a digital token, a still image (e.g., a digital trading card, a digital poster, etc.), a digital signature or identifier, augmented reality content, a live photo, an audio file, a video file, and/or any other suitable non-fungible digital asset or combination of non-fungible digital assets. In certain examples, a non-fungible digital asset may be unique. The non-fungibility of a digital asset may be due to any suitable attribute of the digital asset. For example, the non-fungibility of a digital asset may be due to intrinsic attributes of the digital asset that distinguish the digital asset from other digital assets so as to make the digital assets not readily interchangeable with each other. For example, a first live photo of a first person (e.g., a celebrity, an athlete, etc.) may be intrinsically visually different from and thus not readily interchangeable with a second live photo of a second person that is different than the first person.

In certain examples, the non-fungibility of a non-fungible digital asset may be based solely on an identifier (e.g., a token identifier ("ID")) of the non-fungible digital asset. For example, a first non-fungible digital asset may have a first identifier and a second non-fungible digital asset may have a second identifier. The first non-fungible digital asset and the second non-fungible digital asset may be identical in every way except that the first identifier is different than the second identifier.

In certain examples, the non-fungibility of non-fungible digital assets may be further differentiated based on present or past ownership of the non-fungible digital assets. For example, a certain non-fungible digital asset may have previously been owned by a celebrity, which may render that particular non-fungible digital asset relatively more valuable/collectible than other non-fungible digital assets.

In certain examples, a non-fungible digital asset may be unique with a certain number of them being available (e.g., a certain number of the same digital trading card may be available). Such non-fungible digital assets may be considered as being part of the same series and may be implemented in any suitable manner.

In certain examples, non-fungible digital assets such as those described herein may each include a common attribute and/or association. For example, each non-fungible digital asset may be from the same year or season. Additionally or alternatively, each non-fungible digital asset may be associated with the same athlete and/or celebrity, the same intellectual property group, the same type of award, etc.

As will be described further herein, non-fungible digital assets such as those described herein may be included as part of a set of collectible non-fungible digital assets. Each non-fungible digital asset included in a set of collectible non-fungible digital assets may represent a separate and distinct non-fungible digital asset that may be combined with one or more other non-fungible digital assets included in the set of collectible non-fungible digital assets to form a layered scene.

A set of collectible non-fungible digital assets such as described herein may include or otherwise be associated with metadata that specifies that non-fungible digital assets included in the set of collectible non-fungible digital assets are configured to combine together to form a layered scene. Such metadata may be represented in any suitable format and may include any suitable information and/or attributes associated with non-fungible digital assets and their combinability to form a layered scene. Examples of metadata that may be used to define a set of collectible non-fungible digital assets are described herein.

As used herein, a "layered scene" may include any suitable representation of a combination of non-fungible digital assets that may be included in a set of collectible non-fungible digital assets. Layered scenes such as those described herein may include any suitable type or combination of non-fungible digital assets such as those described herein. For example, a layered scene may include non-fungible digital assets in the form of 2D images, 3D images, augmented reality content, audio clips, animations, video clips, visual effects, movements (e.g., emotes), and/or any other suitable type of content or combination thereof.

In certain examples, in addition or alternative to including non-fungible digital assets, a layered scene may also include or otherwise be augmented by one or more fungible digital assets. For example, a layered scene may include or otherwise be augmented by one or more fungible digital assets in the form of digital stickers, user generated content, public domain content, sounds, special effects, and/or any other content that may be considered as a fungible digital asset. Although fungible digital assets may not be tracked individually due to their fungible nature, if a user owns any instance of a fungible digital asset, a digital asset management system may include the fungible digital asset in a layered scene, without being aware of which particular instance of the fungible digital asset is owned by the user.

In certain examples, a layered scene may be unique with a certain number of them being available. Such layered scenes may be considered as being part of the same series and may be implemented in any suitable manner.

To illustrate an example, a layered scene may represent a collectible 2D image of a "dunk" action performed in a professional basketball game. Such a layered scene may be formed of a set of collectible non-fungible digital assets including a first non-fungible digital asset representing a background image of the basketball game, a second non-fungible asset representing a first player in the basketball game, a third non-fungible digital asset representing a second player in the basketball game, and a fourth non-fungible digital asset representing a third player in the basketball game. The first through fourth non-fungible digital assets may be individually collectible by a user of a computer system. Once the user of the computer system collects at least two of the non-fungible digital assets included in the set of collectible non-fungible digital assets, the collected non-fungible digital assets may be combined in any suitable manner, such as described herein, to form at least part of the layered scene. For example, the first non-fungible digital asset representing a background image of the basketball game may be combined with the third non-fungible digital asset to form at least part of the layered scene. As the user collects more non-fungible digital assets, they may be added to the layered scene to complete the layered scene.

Various advantages and benefits are associated with the systems and methods for digital asset management described herein. For example, systems and methods such as those described herein provide a new type of non-fungible digital asset that is collectible by a user in the form of a layered scene. In addition, systems and methods such as those described herein may facilitate generating optional or alternative configurations of non-fungible digital assets represented as part of a layered scene. Such optional or alternative configurations may beneficially increase value of the non-fungible digital assets included in the set of collectible non-fungible digital assets represented in a layered scene. Moreover, systems and methods such as those described herein may facilitate generating analytics information, which may be used to track popularity, ownership, and/or use of digital assets in different market segments. These and other benefits that may be provided by systems and methods described herein will be evident from the disclosure that follows.

FIG. 1 illustrates an exemplary digital asset management system 100 ("system 100"). As shown, system 100 may include, without limitation, a memory 102 and a processor 104 selectively and communicatively coupled to one another. Memory 102 and processor 104 may each include or be implemented by hardware and/or software components (e.g., processors, memories, communication interfaces, instructions stored in memory for execution by the processors, etc.). In some examples, memory 102 and/or processor 104 may be implemented by any suitable computing device. In other examples, memory 102 and/or processor 104 may be distributed between multiple devices and/or multiple locations as may serve a particular implementation. An illustrative implementation of system 100 is described herein.

Memory 102 may maintain (e.g., store) executable data used by processor 104 to perform any of the operations described herein. For example, memory 102 may store instructions 106 that may be executed by processor 104 to perform any of the operations described herein. Instructions 106 may be implemented by any suitable application, software, code, and/or other executable data instance.

Memory 102 may also maintain any data received, generated, managed, used, and/or transmitted by processor 104. Memory 102 may store any other suitable data as may serve a particular implementation. For example, memory 102 may store data representative of sets of collectible digital assets such as sets of collectible non-fungible digital assets, analytical information associated with use of digital assets, information regarding augmentation of digital assets, metadata associated with digital assets, notifications, graphics, and/or any other suitable data.

Processor 104 may be configured to perform (e.g., execute instructions 106 stored in memory 102 to perform) various processing operations associated with digital asset management. For example, processor 104 may record, in a distributed record configured to track ownership of non-fungible digital assets, ownership information associated with a non-fungible digital asset that is included in a set of collectible non-fungible digital assets. These and other operations that may be performed by processor 104 are described herein.

System 100 (e.g., processor 104) may be configured to provide any suitable service and/or feature that may be associated with digital assets as may serve a particular implementation. For example, system 100 may be configured to generate digital assets, manage ownership transfer of digital assets, facilitate sharing of digital assets, facilitate augmentation of digital assets, facilitate use of digital assets, and/or provide any other suitable service and/or feature that may facilitate management of one or more digital assets.

System 100 may be configured to generate a set of collectible non-fungible digital assets. This may be accomplished in any suitable manner. For example, system 100 may provide any suitable user interface to facilitate a user indicating which content (e.g., images, videos, audio, etc.) is to be used to generate the set of collectible non-fungible digital assets. Any suitable protocol (e.g., blockchain protocol) may be used to facilitate generating a set of collectible non-fungible digital assets as may serve a particular implementation. For example, system 100 may use an Ethereumbased non-fungible token ("NFT") standard such as ERC-721 to facilitate generating a set of collectible non-fungible digital assets.

Figure 2:
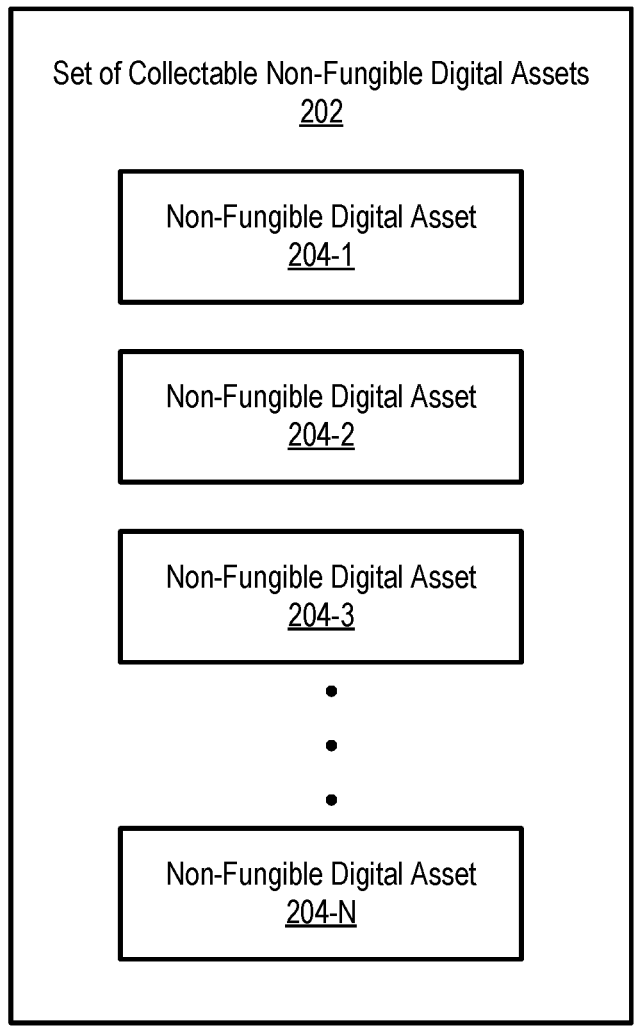
FIG. 2 illustrates an exemplary set of collectible non-fungible digital assets that may be implemented according to principles described herein.

A set of collectible non-fungible digital assets such as described herein may include any number or combination of non-fungible digital assets as may serve a particular implementation. To illustrate, FIG. 2 shows set of collectible non-fungible digital assets 202 including non-fungible digital assets 204 (e.g., non-fungible digital asset 204-1 through 204-N) that may be generated by system 100. In certain examples, each of non-fungible digital assets 204 may correspond to a same type of non-fungible digital asset. For example, each of non-fungible digital assets 204 may correspond to a two-dimensional ("2D") non-fungible digital asset. In certain alternative implementations, non-fungible digital assets 204 may include a combination of different types of non-fungible digital assets. For example, non-fungible digital assets 204 may include a combination of 2D non-fungible digital assets, audio non-fungible digital assets, three-dimensional ("3D") non-fungible digital assets, etc.

In certain examples, system 100 may encrypt non-fungible digital assets 204. This may be accomplished in any suitable manner. For example, system 100 may use any suitable form of digital rights management ("DRM"), tokenized authorization, encrypted manifests, watermarking/steganography, and/or any other suitable form of content security to secure non-fungible digital assets 204.

In certain examples, system 100 may also generate metadata that specifies attributes of non-fungible digital assets 204 included in set of collectible non-fungible digital assets 202 and that indicates that non-fungible digital assets 204 in the set of collectible non-fungible digital assets 202 are configured to combine together to form a layered scene. For example, metadata associated with non-fungible digital assets 204 and a layered scene may include layer level information, file type information, positioning information, layered scene type (e.g., a 2D layered scene, a 3D layered scene, an augmented reality ("AR") layered scene, a static layered scene, a moving layered scene, etc.), dimensions of a non-fungible digital asset, information defining a relative position of non-fungible digital assets with respect to each other, information defining a relative angle of non-fungible digital assets with respect to each other, information defining boundaries of an area (e.g., of a base layer non-fungible digital asset) where non-fungible digital assets may be positioned, rendering rules for combining layers of a layered scene (e.g., that define combining order of layers, overlap characteristics of layers, occlusion characteristics of layers, etc.), and/or any other suitable information and/or attribute. Additionally or alternatively, attributes specified by the metadata may include depth maps, bump maps, texture maps, displacement maps, and/or attributes that govern ray-tracing, specular highlights, shading/reflections, and/or other rendering properties for dynamic lighting and special effect objects/filters.

In certain examples, the metadata may additionally or alternatively include one or more conditional or trigger parameters that may activate depending on a predefined condition associated with set of collectible non-fungible digital assets 202 being satisfied. For example, such conditional or trigger parameters may activate based on user input, a time of day, a holiday, a season, a geographic location, and/or any other suitable condition. To illustrate an example, the metadata may cause a layered scene to adaptively appear relatively more dark when experienced by a user at nighttime and may cause the layered scene to adaptively appear relatively more light when experienced during the day. In certain examples, system 100 may facilitate a user selectively turning on/off conditional or trigger parameters such as those described herein.

In certain examples, the metadata may include set specific metadata that defines any suitable attribute and/or information associated with set of collectible non-fungible digital assets 202. Additionally or alternatively, the metadata may individually define any suitable attribute and/or information associated with each non-fungible digital asset 204 included in set of collectible non-fungible digital assets 202.

In certain examples, one or more of the attributes described herein may correspond to or otherwise be associated with a separate non-fungible digital asset that may be included as part of a layered scene. For example, texture maps, shading/reflections, dynamic lighting, special effect objects/filters, etc. may each correspond to a separate non-fungible digital asset that may additionally or alternatively be included as part of a layered scene.

In examples where a layered scene corresponds to a 3D layered scene, metadata associated with a 3D non-fungible digital asset in the 3D layered scene may include relative position information indicated in cartesian coordinates and an orientation specified/determined by polar coordinates (phi, theta, and r) for scale. In examples where a layered scene includes AR content, attributes specified by the metadata may include x, y, and z coordinates of non-fungible digital assets represented in the layered scene.

In certain examples, system 100 may have access to all of the metadata needed to generate a layered scene once at least one of non-fungible digital assets 204 has been collected. As will be described further herein, system 100 may use the metadata to form a partial or complete layered scene, to notify a user of other non-fungible digital assets 204 of set of collectible non-fungible digital assets 202 to be collected, and/or for any other suitable purpose such as described herein.

Figure 3:
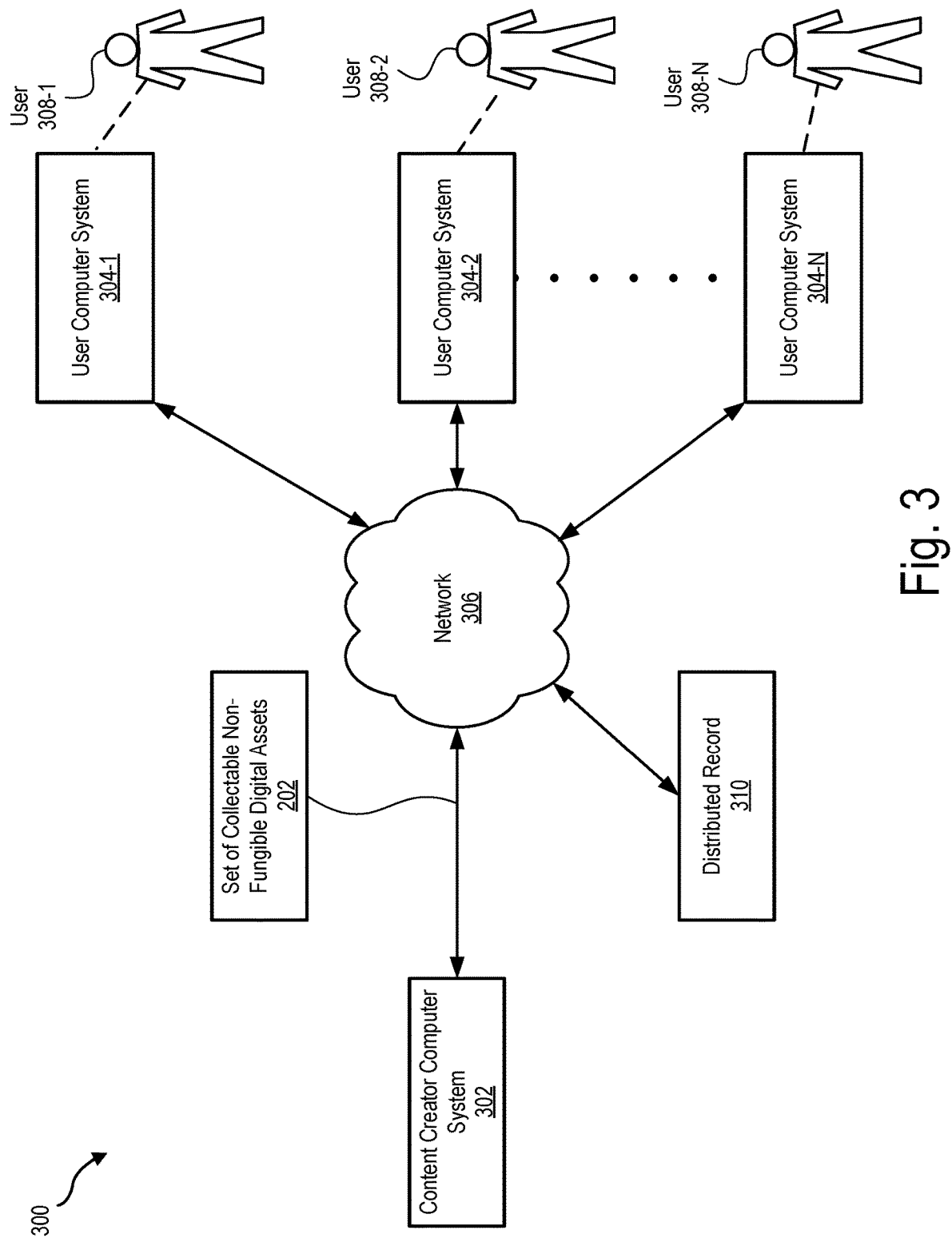
FIG. 3 illustrates an exemplary implementation of the digital asset management system of FIG. 1 according to principles described herein.

System 100 may be implemented in any suitable manner as may serve a particular application. FIG. 3 shows an exemplary implementation 300 in which system 100 may be provided in certain examples. As shown in FIG. 3, implementation 300 includes a content creator computer system 302 that is communicatively connected to a plurality of user computer systems 304 (e.g., user computer systems 304-1 through 304-N) by way of a network 306. Content creator computer system 302 and user computer systems 304 may be implemented by any suitable computing device or combination of computing devices as may serve a particular implementation. For example, content creator computer system 302 and/or user computer systems 304 may be implemented by desktop computers, laptop computers, smartphones, and/or any other suitable type of computing device. System 100 may be implemented by either content creator computer system 302 or user computer system 304. Alternatively, system 100 may be distributed across content creator computer system 302, user computer systems 304, and/or any other suitable computer system.

Content creator computer system 302 and user computer systems 304 may communicate using any communication platforms and technologies suitable for transporting data and/or communication signals, including known communication technologies, devices, media, and protocols supportive of remote communications, examples of which include, but are not limited to, data transmission media, communications devices, and data transmission protocols.

Network 306 may include, but is not limited to, one or more wireless networks (Wi-Fi networks), wireless communication networks, mobile telephone networks (e.g., cellular telephone networks), mobile phone data networks, broadband networks, narrowband networks, the Internet, local area networks, wide area networks, live television transmission networks, and any other networks capable of carrying media content, data, and/or communications signals between content creator computer system 302 and user computer systems 304. Communications between content creator computer system 302 and user computer systems 304 may be transported using any one of the above-listed networks, or any combination or sub-combination of the above-listed networks. Alternatively, content creator computer system 302 and user computer systems 304 may communicate in another way such as by one or more direct connections between content creator computer system 302 and user computer systems 304.

Content creator computer system 302 may be owned or operated by an entity that creates a set of collectible non-fungible digital assets 202. Such an entity may use content creator system 302 (e.g., system 100) in any suitable manner to specify content (e.g., images, videos, audio content, etc.) to be used to form set of collectible non-fungible digital assets 202.

As shown in FIG. 3, content creator computer system 302 may send or otherwise make accessible the set of collectible non-fungible digital assets 202 by way of network 306 to one or more of user computer systems 304 that are each associated with a user 308 (e.g., users 308-1 through 308-N). Content creator computer system 302 may send or otherwise make accessible the set of collectible non-fungible digital assets 202 by way of network 306 in any suitable manner. For example, one or more non-fungible digital assets included in the set of collectible non-fungible digital assets 202 may be distributed or shared by way of delivery (e.g., a push notification) to a computing device in the form of a text message, an email, etc. In certain examples, one or more non-fungible digital assets included in the set of collectible non-fungible digital assets 202 may be distributed as part of an in-application feed where content may be curated for and recommended to a particular user by for example a digital wallet application. In certain examples, one or more non-fungible digital assets included in the set of collectible non-fungible digital assets 202 may be distributed by way of notifications/badging, automated social media posting, marketplace/trading platforms, and/or auto-exported displays such as web or virtual reality ("VR") galleries. In certain examples, scannable codes (e.g., QR codes) may be used to facilitate sharing non-fungible digital assets between users. For example, such scanned codes may be used to access and/or browse public web or VR galleries where non-fungible digital assets 204 may be hosted. In certain implementations, non-fungible digital assets such as those described herein may be distributed by way of an airdrop to one or more of user computer systems 304.

The set of collectible non-fungible digital assets 202 may be stored in any suitable manner and at any suitable location as may serve a particular implementation. In certain examples, the set of collectible non-fungible digital assets 202 may be stored remotely from user computer systems 304 and may be accessible by user computer systems 304 by way of network 306. For example, the set of collectible non-fungible digital assets 202 may be hosted at a server that is remote from user computer systems 304. User computer system 304-1, for example, may implement a digital wallet application that stores keys that are usable to access the set of collectible non-fungible digital assets 202 wherever they are stored. For example, the keys may be used to access the set of collectible non-fungible digital assets 202 at a network address associated with the set of collectible non-fungible digital assets 202 and hosted by the server. Such a server may be implemented as part of content creator computer system 302 or may be a third-party server that is remote from content creator computer system 302 and user computer systems 304. In certain alternative implementations, the keys stored by a digital wallet application may be used to access the set of collectible non-fungible digital assets 202 from a local storage device of user computer system 304-1.

In certain examples, some of non-fungible digital assets 204 may be stored locally by a local storage device of computer system 304-1 while other of non-fungible digital assets 204 may be stored remotely (e.g., at a third party server, a hardware wallet, etc.). In such examples, an amount of available storage in the local storage device of user computer system 304-1 may trigger an offloading of one or more non-fungible digital asset 204 to a remote storage location.

In certain examples, non-fungible digital assets 204 may include an embedded uniform resource locator ("URL") (or an array of URLs) that may be used to access and/or download non-fungible digital assets 204 through a content delivery network.

System 100 (e.g., system 100 implemented by content creator computer system 302) may be configured to record information associated with transfer of ownership, sharing, augmentation, etc. of a non-fungible digital asset included in the set of collectible non-fungible digital assets 202 in a distributed record 310. To that end, content creator computer system 302 and user computer systems 304 may be configured to form distributed record 310 to facilitate tracking ownership and/or use of non-fungible digital assets included in the set of collectible non-fungible digital assets 202. Distributed record 310 may correspond to any suitable type of distributed record as may serve a particular implementation. For example, distributed record 310 may correspond to a distributed ledger that is implemented by blockchain in certain examples. Although distributed record 310 is shown as being separate from content creator computer system 302 and user computer systems 304, it is understood that a copy of distributed record 310 may be stored in any suitable storage device associated with either content creator computer system 302, user computer systems 304, and/or any other suitable computer system. Alternatively, distributed record 310 may be distributed across content creator computer system 302, user computer systems 304, and/or any other suitable computer system.

In certain examples, metadata such as described herein may be stored as part of distributed record 310. Additionally or alternatively, the metadata may be stored on each user computer system 304, on content creator computer system 302, and/or at any other suitable location.

In certain examples, metadata such as described herein may be implemented by a digital wallet application operating on content creator computer system 302 and/or user computer systems 304. Such a digital wallet application may be configured to (e.g., programmed to) operate in accordance parameters specified by the metadata.

System 100 may record, in distributed record 310, ownership information associated with the set of collectible non-fungible digital assets 202. The ownership information may include any suitable information regarding which non-fungible digital assets included in the set of collectible non-fungible digital assets 202 are owned by a given entity. For example, the ownership information may indicate that user 308-1 owns non-fungible digital asset 204-1 and non-fungible digital asset 204-2 included in the set of collectible non-fungible digital assets 202 shown in FIG. 2.

Based on the metadata and the ownership information associated with the set of collectible non-fungible digital assets 202, system 100 may generate a layered scene for presentation by a computer system to a user. A layered scene may include any suitable number of layers as may serve a particular implementation. In certain examples, a layered scene may include a base layer and a plurality of additional layers. For example, a layered scene may include a base layer as layer 0 and additional layers as layer 1, layer 2, layer 3, layer 4, etc. In certain examples, a layered scene may include a background layer, a midground layer, and a foreground layer.

System 100 may generate the layered scene in any suitable manner. For example, system 100 use the metadata associated with the set of collectible non-fungible digital assets 202 to determine which non-fungible digital assets 204 included in the set of collectible non-fungible digital assets 202 are to be combined together to form a layered scene and how they are to be combined. For example, if user 308-1 owns each of non-fungible digital assets 204, system 100 may combine those non-fungible digital assets 204 together based on the metadata to form a complete version of the layered scene. Alternatively, if user 308-1 only owns a subset of collectible non-fungible digital assets 204, system 100 may combine those non-fungible digital assets 204 together to form a partial version of the layered scene.

In certain examples, each non-fungible digital asset 204 included in the set of collectible non-fungible digital assets 202 may be provided on a different layer of the layered scene. For example, non-fungible digital asset 204-1 may be provided on a first layer of the layered scene, non-fungible digital asset 204-2 may be provided on a second layer of the layered scene, non-fungible digital asset 204-3 may be provided on a third layer of the layered scene, and so forth.

In certain alternative examples, at least some of non-fungible digital assets 204 included in the set of collectible non-fungible digital assets 202 may be configured, based on the metadata, to be provided on a same layer of the layered scene. For example, non-fungible digital asset 204-1 may be provided on a first layer of the layered scene and non-fungible digital assets 204-2 and 204-3 may each be provided on a second layer of the layered scene.

In certain examples, at least some of non-fungible digital assets 204 may spatially overlap one another when combined together to form the layered scene. For example, non-fungible digital assets 204-1 and 204-2 may partially or fully overlap one another when combined together to form the layered scene.

In certain examples, at least some of non-fungible digital assets 204 included in the set of collectible non-fungible digital assets 202 may be reversibly combinable together. For example, user 308-1 may collect non-fungible digital assets 204-1, 204-2, and 204-3. After system 100 generates the layered scene, user 308-1 may decide to sell or otherwise transfer non-fungible digital asset 204-2 to user 308-2. As a result, system 100 may record updated ownership information in the distributed record regarding the change in ownership from user 308-1 to user 308-2. As a result of the updated ownership information, non-fungible digital asset 204-2 is no longer available to be presented to user 308-1 in the layered scene.

In certain examples, at least some of non-fungible digital assets 204 included in the set of collectible non-fungible digital assets 202 may be irreversibly combinable together. For example, user 308-1 may collect each of non-fungible digital assets 204 included as part of the layered scene. Once collected, system 100 may irreversibly combine non-fungible digital assets 204 together to form the layered scene in any suitable manner. In such examples, the layered scene may be considered as a separate combined non-fungible digital asset that may be accessed, shared, sold, and/or stored as such in any suitable manner.

In certain examples, system 100 may automatically combine non-fungible digital assets 204 included in the set of collectible non-fungible digital assets 202 together based on the ownership information and the metadata associated with the set of collectible non-fungible digital assets 202. For example, if user 308-1 only currently owns non-fungible digital asset 204-1 and non-fungible digital asset 204-3, system 100 may automatically combine them together based on the metadata to form a partial version of the layered scene that may be provided for presentation to user 308-1 by way of user computer system 304-1.

Figure 4:
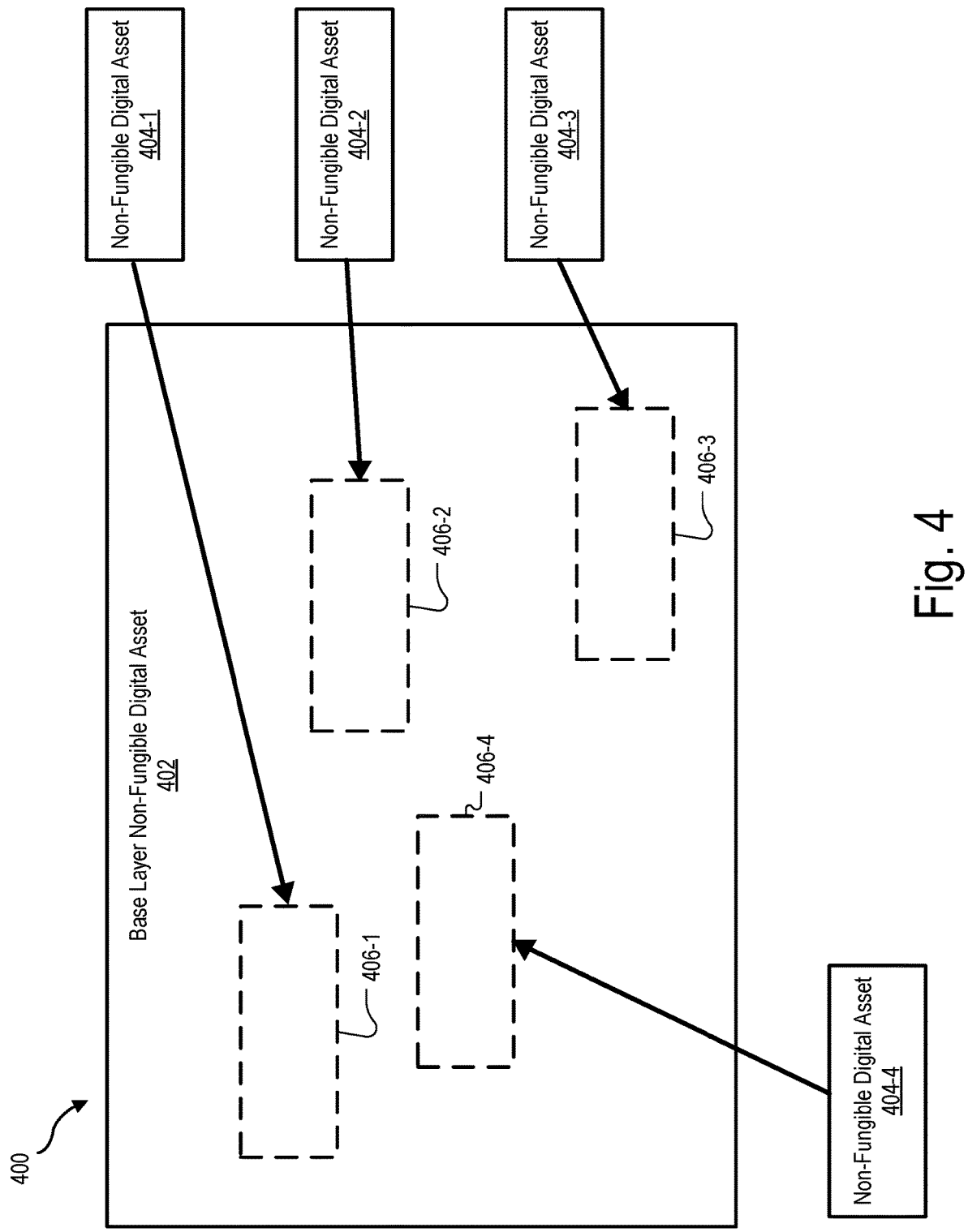
FIGS. 4-5 illustrate exemplary layered scenes that may be implemented according to principles described herein.

In certain alternative implementations, system 100 may facilitate a user combining non-fungible digital assets together to form a layered scene. To illustrate an example, FIG. 4 shows an exemplary layered scene 400 that may be presented by way of a computer system (e.g., user computer system 304-1). As shown in FIG. 4, layered scene 400 includes a base layer non-fungible digital asset 402 and a plurality of additional non-fungible digital assets 404 (e.g., non-fungible digital assets 404-1 through 404-4) that may be placed at respective positions 406 (e.g., positions 406-1 through 406-4) with respect to base layer non-fungible digital asset 402. System 100 may present base layer non-fungible digital asset 402 for display and facilitate a user providing any suitable user input to move non-fungible digital assets 404 to their respective positions 406 within base layer non-fungible digital asset 402. For example, a user may provide a touch input, a cursor movement, or any other suitable user input (e.g., by way of user computer system 304-1) to move non-fungible digital asset 404-1 to position 406-1.

In certain examples, the metadata associated with layered scene 400 may include information specifying that any one or all of non-fungible digital assets 404 are configured to be located at a predefined position with respect to base layer non-fungible digital asset 402 when combined with base layer non-fungible digital asset 402. In such examples, one or more of positions 406 may be fixed with respect to base layer non-fungible digital asset 402. For example, non-fungible digital asset 404-1 may only be configured to be positioned at position 406-1 when combined with base layer non-fungible digital asset 402 to form layered scene 400.

In certain examples, one or more of non-fungible digital assets 404 may have a plurality of predefined positions where they may alternatively be located within layered scene. For example, non-fungible digital asset 404-1 may be alternatively located at a first predefined position, a second predefined position, or a third predefined position with respect to base layer non-fungible digital asset 402.

In examples where one or more of positions 406 corresponds to a fixed predefined position, system 100 may provide a visual indicator showing where a particular non-fungible digital asset 404 should be located with respect to base layer non-fungible digital asset 402. Such a visual indicator may be provided for display in any suitable manner. For example, position 406-1 may be shaded, highlighted, or have any other suitable visual indicator showing that non-fungible digital asset 404-1 is configured to be positioned at position 406-1. In certain examples, a visual indicator may have a shape that matches a shape of a corresponding non-fungible digital asset 404 that is configured to be located at a position 406 within base layer non-fungible digital asset 402. For example, if non-fungible digital asset 404-2 corresponds to an image of an animal, both non fungible digital asset 404-2 and a visual indicator at position 406-2 may have the shape of the animal.

In certain examples, system 100 may provide a notification when a non-fungible digital asset 404 achieves a position 406. For example, system 100 may provide an audio notification, a graphical notification, a haptic feedback notification, a special effect, a movement (e.g., an emote), and/or any other suitable notification when one of non-fungible digital assets 404 achieves a corresponding position 406. To illustrate an example, non-fungible digital asset 404-1 may correspond to a virtual laser blaster that may be positioned at position 406-1. In such an example, system 100 may cause a laser blaster sound to play (e.g., by way of a speaker associated with user computer system 304-1) when non-fungible digital asset 404-1 is placed at position 406-1.

In certain examples, one or more of positions 406 may correspond to magnetized positions (also referred to as "snap" or "snap-to" positions). In such examples, one or more of non-fungible digital assets 404 may be configured with magnetized vertices to enforce a predefined orientation with respect to layered scene 400. For example, when non-fungible digital asset 404-1 is moved toward and is within a predefined distance from position 406-1, system 100 may automatically move and/or reorient non-fungible digital asset 404-1 to assume the predefined orientation at position 406-1. In so doing, system 100 may cause non-fungible digital asset 404-1 to snap into position at position 406.

In certain examples, a given non-fungible digital asset 404 may have a plurality of possible magnetized positions with respect to base layer non-fungible digital asset 402. To illustrate an example, non-fungible digital asset 404-1 may correspond to a hat that is placeable within an image of a room represented by base layer non-fungible digital asset 402. In such an example, possible magnetized positions within the room where the hat may alternatively be located may include a character's head, a hat rack, a bedpost, a character's hand, a shelf, etc.

In certain examples, at least some of non-fungible digital assets 404 may be configured to be located at a user selected position with respect to base layer non-fungible digital asset 402 when combined with base layer non-fungible digital asset 402. In such examples, one or more of positions 406 may not be fixed with respect to base layer non-fungible digital asset 402. As such, one or more of non-fungible digital assets 404 may be positioned anywhere with respect to base layer non-fungible digital asset 402 and are not limited to the exemplary positions 406 shown in FIG. 4.

Figure 5:
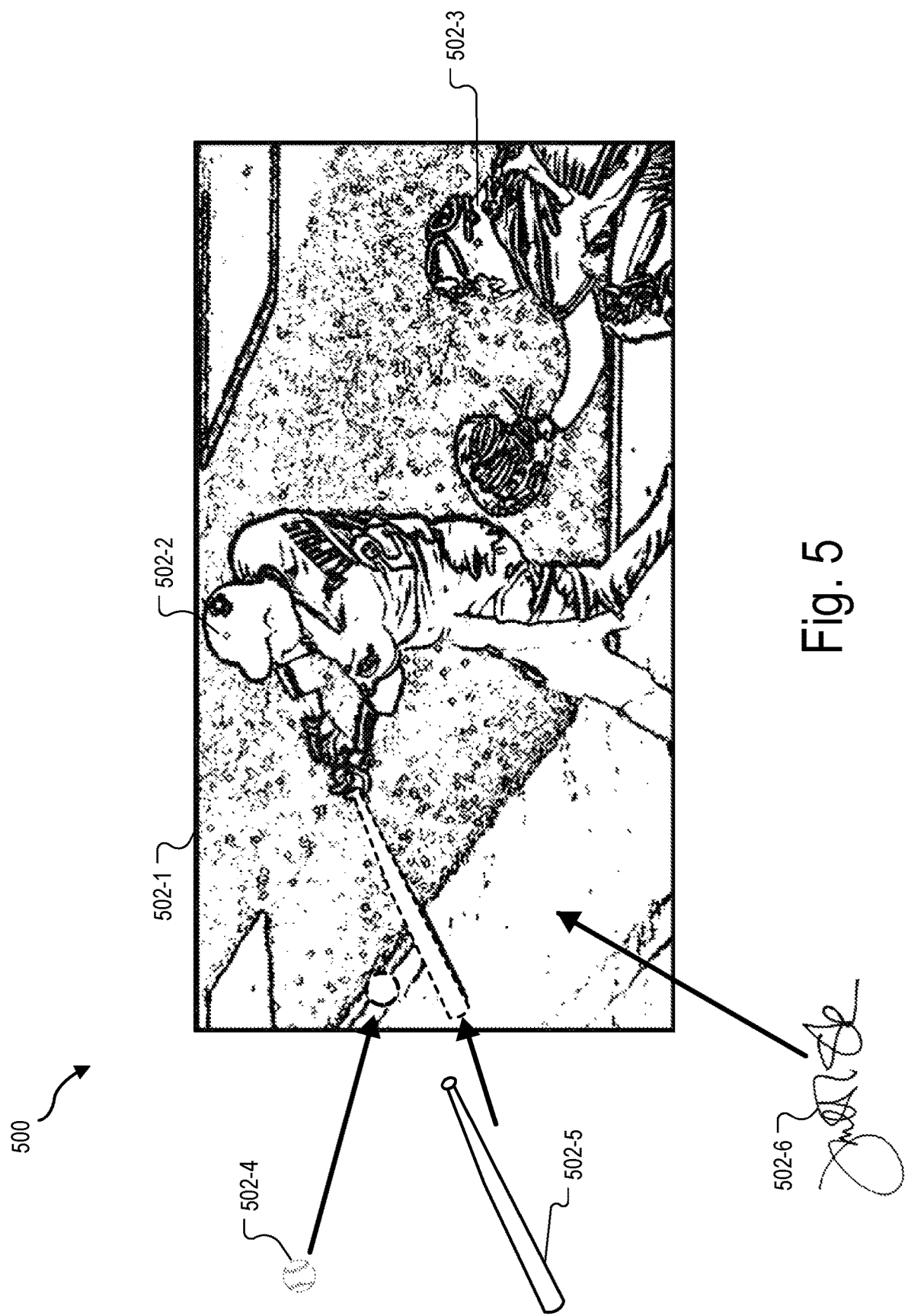

FIG. 5 shows another exemplary layered scene 500 that may be provided for display by system 100 in certain implementations. As shown in FIG. 5, layered scene 500 includes non-fungible digital assets 502 (e.g., non-fungible digital assets 502-1 through 502-6) that, when combined together, form an image of a baseball game. Non-fungible digital asset 502-1 corresponds to a background image of a scene associated with the baseball game. In the example shown in FIG. 5, non-fungible digital asset 502-1 may be considered as a base layer non-fungible digital asset. Non-fungible digital assets 502-2 through 502-6 correspond to additional layers of the layered scene that are configured to overlap non-fungible digital asset 502-1. In the example shown in FIG. 5, non-fungible digital asset 502-2 corresponds to a batter, non-fungible digital asset 502-3 corresponds to a catcher, non-fungible digital asset 502-4 corresponds to a baseball, non-fungible digital asset 502-5 corresponds to a baseball bat, and non-fungible digital asset 502-6 corresponds to a signature of the batter represented by non-fungible digital asset 502-2.

In the example shown in FIG. 5, non-fungible digital assets 502-2 through 502-5 are configured to be positioned at predefined positions and orientations within non-fungible digital asset 502-1 so that layered scene 500 is accurately represented as a baseball player hitting a ball. Non-fungible digital assets 502-2 and 502-3 are already located at their predefined positions and orientations within non-fungible digital asset 502-1. Non-fungible digital assets 502-4 and 502-5 on the other hand may be moved in any suitable manner, such as described herein, to the positions indicated by dashed lines within non-fungible digital asset 502-1. Non-fungible digital asset 502-6 is not configured to be positioned at a predefined position and may be moved to any suitable user selected position within non-fungible digital asset 502-1. In certain examples, the signature represented by non-fungible digital asset 502-6 may represent a topmost layer of layered scene 500.

In certain examples, system 100 may use any suitable algorithm or method (e.g., artificial intelligence ("AI"), computer vision, machine learning, etc.) to detect objects and positions of objects in a layered scene and recommend positions and/or modifications of non-fungible digital assets and/or other objects within the layered scene based on the detection. For example, system 100 may use computer vision to detect faces/bodies, light/dark backgrounds, surface planes, occluding objects, etc. within an AR layered scene. Based on the detection, system 100 may reposition a non-fungible digital asset within the AR scene to improve visibility, prevent occlusion, and/or for any other suitable purpose. Additionally or alternatively, system 100 may occlude, remove, or blur one or more objects detected in a layered scene. For example, system 100 may detect an unlicensed logo and/or inappropriate content within a layered scene and may blur or otherwise obscure that content in real time to prevent them from being viewable within the layered scene.

In certain examples, a layered scene such as layered scene 500 may include optional or alternative non-fungible digital assets that may be added or changed by a user. For example, the uniform of the batter represented by non-fungible digital asset 502-2 in FIG. 5 may correspond to a separate non-fungible digital asset that is optionally or alternatively replaceable. In such an example, there may be a first non-fungible digital asset for a home uniform, a second non-fungible digital asset for an away uniform, and a third non-fungible digital asset for a uniform of a different team. The different uniform options may be alternatively represented as being worn by the batter based on user input. System 100 may present such different optional non-fungible digital assets for user selection in any suitable manner. For example, system 100 may present the optional non-fungible digital assets in a dropdown list or in a carousel in which icons, graphics, or text representative of the different alternative non-fungible digital assets are selectable by a user.

The exemplary layered scene 500 shown in FIG. 5 is provided for illustrative purposes only. It is understood that a layered scene may be implemented in different ways in different examples. For example, a layered scene may be used in a wayfinding implementation to guide users through a physical environment (e.g., a museum, a zoo, a park, etc.) and enhance their understanding of and/or experience in the physical environment. In such an example, non-fungible digital assets associated with the layered scene may correspond to virtual badges that may be collected to track completion of an experience at the physical environment. Other possible implementations in which a layered scene may be used may include an escape room implementation, a geocapture implementation, a puzzle implementation in which different pieces of the puzzle correspond to different non-fungible digital assets of a layered scene, a loyalty program implementation in which loyalty points may be used to unlock/reveal different non-fungible digital assets of a layered scene, a story narrative implementation, a live wallpaper implementation, and/or in any other suitable type of implementation.

Figure 6:
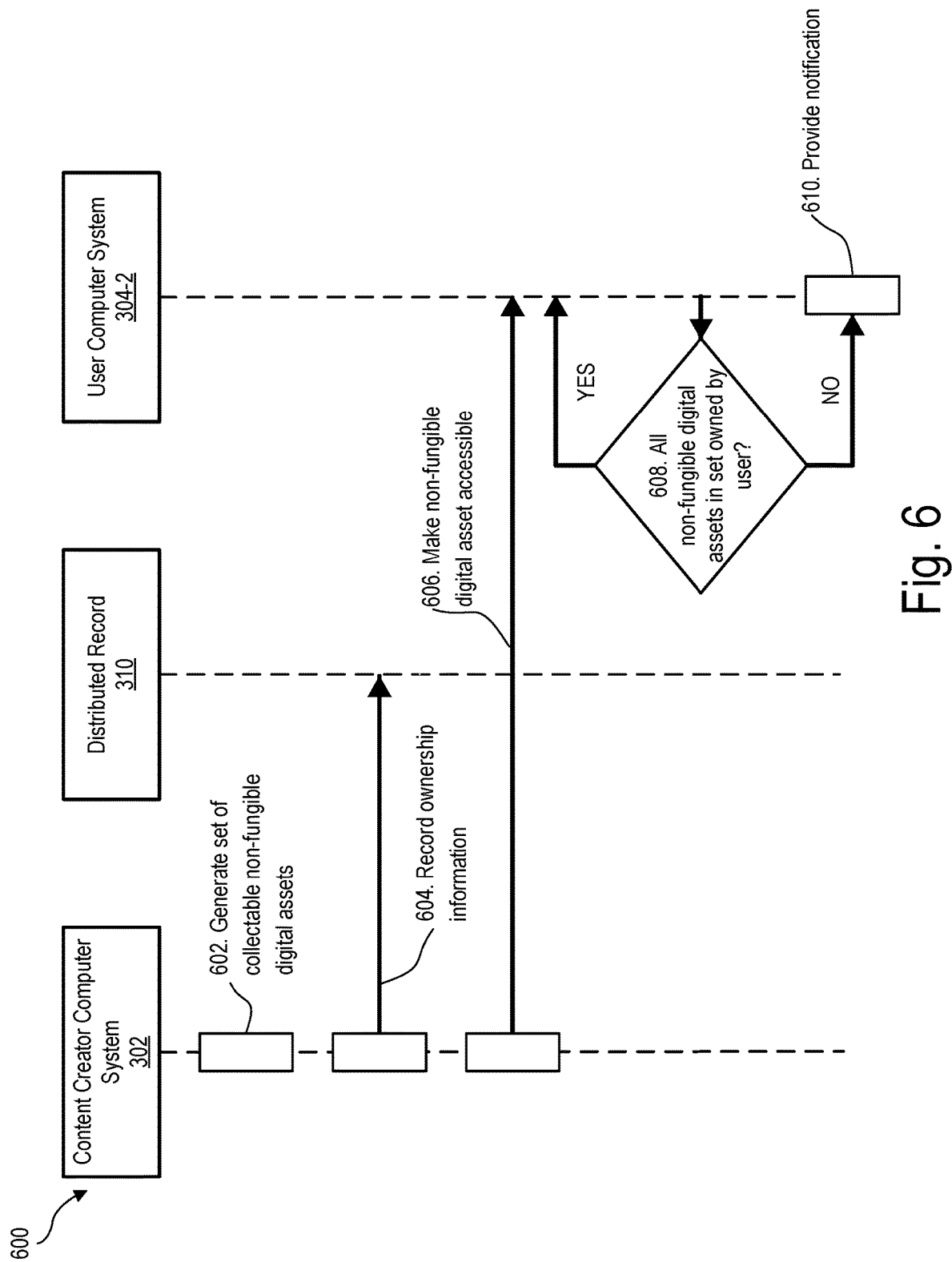
FIG. 6 illustrates an exemplary flow chart showing various operations that may be performed according to principles described herein.

FIG. 6 is a flow diagram 600 that depicts exemplary operations that may be performed by system 100 in certain implementations. At operation 602, content creator computer system 302 may generate a set of collectible non-fungible digital assets (e.g., set of collectible non-fungible digital assets 202). In certain examples, the generating of the set of collectible non-fungible digital assets may include generating a base layer non-fungible digital asset and a plurality of additional non-fungible digital assets.

At operation 604, content creator computer system 302 may record ownership information associated with the set of collectible non-fungible digital assets in distributed record 310. Such ownership information may indicate that user 308-2 of user computer system 304-2 owns at least some non-fungible digital assets included in the set of collectible non-fungible digital assets.

At operation 606, content creator computer system 302 may make the non-fungible digital assets that are included in the set of collectible non-fungible digital assets and that are owned by user 308-2 accessible to user computer system 304-2. In certain examples, content creator computer system 302 may transmit the non-fungible digital assets owned by user 308-2 of user computer system 304-2 to user computer system 304-2 in any suitable manner. Alternatively, content creator computer system 302 may provide information to user computer system 304-2 that indicates where the non-fungible digital assets owned by user 308-2 of user computer system 304-2 may be accessed. For example, content creator computer system 302 may provide a website address where the non-fungible digital assets owned by user 308-2 are hosted. In certain examples, information regarding the website address may be recorded in distributed record 310.

At any given time, user 308-2 of user computer system 304-2 may only own a subset of the non-fungible digital assets included in a set of collectible non-fungible digital assets. Accordingly, at operation 608, user computer system 304-2 may determine whether all of the non-fungible digital assets included in the set of collectible non-fungible digital assets are owned by user 308-2. This may be accomplished in any suitable manner. For example, user computer system 304-2 may access distributed record 310 to determine which non-fungible digital assets included in the set of collectible non-fungible digital assets are owned by user 308-2. If the answer at operation 608 is "YES," the flow may return to before operation 608 as shown in FIG. 6.

If the answer at operation 608 is "NO," user computer system 304-2 may provide a notification including information associated with missing non-fungible digital assets included in the set of collectible non-fungible digital assets. Such a notification may be provided in any suitable manner. For example, user computer system 304-2 may provide a text notification, an audio notification, a graphical notification, and/or any other suitable notification. The notification may provide any suitable information as may serve a particular implementation. For example, the notification may point out which non-fungible digital asset(s) is/are needed to complete the layered scene, may encourage the user to obtain the missing non-fungible digital asset(s), and/or may provide information regarding how to obtain the missing non-fungible digital asset(s).

In certain examples, a layered scene may include unlockable content that may be accessed and/or revealed based on satisfaction of a predefined condition. In such examples, the predefined condition may include a threshold number of non-fungible digital assets in the layered scene being owned by a user, satisfaction of an interaction requirement (e.g., a time requirement, a volume requirement, a value requirement, number of social interactions with other users, a transaction requirement, a geolocation visitation requirement, a viewing requirement (e.g., to avoid spoilers), an event requirement (e.g., an outcome of a championship game), etc.), and/or any other suitable condition. To illustrate an example, a layered scene may include a first non-fungible digital asset that is a base layer non-fungible digital asset, a second non-fungible digital asset, and a third non-fungible digital asset that are each images that may be positioned with respect to the first non-fungible digital asset. The layered scene may also include a fourth non-fungible digital asset in the form of an audio track (e.g., music, a sound effect, etc.) that is unlockable and may owned and experienced by the user as part of the layered scene only once the user already owns each of the first, second, and third non-fungible digital assets.

In certain examples, system 100 may automatically generate optional or alternative configurations of non-fungible digital assets represented as part of a layered scene. In such examples, system 100 may use any suitable algorithm to automatically generate content to recommend to a user. For example, system 100 may access ownership information, user information, interaction information, and/or any other suitable information associated with a user. System 100 may then use such information in any suitable manner to automatically generate optional or alternatively configured layered scenes that may be recommended to the user.

In certain examples, system 100 may facilitate an owner of a layered scene such as described herein sharing the layered scene with a third party. In such examples, system 100 may implement a share function as an ownership function associated with a set of collectible non-fungible digital assets that may be represented in a layered scene. Such a share function may specify one or more use restrictions associated with the shared use of the layered scene. For example, such use restrictions may include, but are not limited to, time restrictions for viewing and/or accessing the layered scene, ownership transfer restrictions, modification restrictions, and/or any other suitable use restriction. With a share function, there may be a main owner of the layered scene and one or more partial owners that have restricted ownership. The share function may beneficially permit the main owner to share a layered scene with one or more partial owners without having to worry that the one or more partial owners will modify the layered scene and/or transfer one or more of the non-fungible digital assets included in the layered scene to a third party.

To illustrate an example in which a share function may be implemented, a layered scene may correspond to a digital poster that depicts a team picture of a plurality of athletes on a professional sports team. Each image of an athlete in the digital poster may correspond to a separate distinct non-fungible digital asset. After a user collects at least some of the non-fungible digital assets of the athletes on the team, the user may want to share the digital poster with one or more friends and/or family. In such an example, the share function may facilitate system 100 providing restricted use sharing of the digital poster with the one or more friends and/or family of the user according to operations similar to those such as those described herein. Accordingly, the user may be able to selectively share partial ownership of the digital poster with the one or more friends and/or family subject to certain restrictions such as a time restriction. A user account of the user may then receive full ownership of the digital poster back after, for example, a predefined time period expires.

In certain examples, the share function may include providing indicators and/or notifications to a partial owner that indicate the restricted use and/or partial ownership of a shared non-fungible digital asset. For example, a shared digital poster may be provided for display in a graphical user interface together with an indicator in the form of a lock icon, a watermark, and/or any other suitable indicator that may inform a partial owner that they are merely sharing the non-fungible digital asset and do not own the non-fungible digital asset. Additionally or alternatively, a timer indicator or graphic may be provided for display together with the shared digital poster to indicate how much time remains to view the shared digital poster.

In certain examples, the share function may facilitate combining non-fungible digital assets owned by two or more different users together to generate a layered scene. For example, a first user may own a first non-fungible digital asset included in a set of collectible non-fungible digital assets and a second user my own a second non-fungible digital asset included in the set of collectible non-fungible digital assets. The second user may share the second non-fungible digital asset with the first user such that the first user has restricted use of the second non-fungible digital asset. In such an example, system 100 may combine the first non-fungible digital asset and the second non-fungible digital asset in any suitable manner such as described herein to form a layered scene in which different users own different portions of the layered scene. The second non-fungible digital asset may then be returned to the second user, for example, after expiration of a predefined amount of time.

In certain examples, system 100 may facilitate transferring ownership of non-fungible digital assets between users. This may be accomplished in any suitable manner. For example, in certain instances ownership transfer may occur on an individual basis where ownership of each non-fungible digital asset included in a set of collectible non-fungible digital assets may be transferred separately. Alternatively, ownership transfer may occur on a set basis where ownership is transferable only for the entire set of collectible non-fungible digital assets or for some threshold sub-combination of non-fungible digital assets included in the set of collectible non-fungible digital assets.

In certain examples, system 100 may facilitate providing optional or alternative non-fungible digital assets in a layered scene. For example, the signature represented by non-fungible digital asset 502-6 shown in FIG. 5 may correspond to an optional non-fungible digital asset that may be provided with respect to layered scene 500. In certain examples, non-fungible digital assets may be selectively viewable together with the layered scene. For example, when the optional non-fungible digital asset includes a signature provided with a layered scene that is a digital poster, system 100 may facilitate a user turning the signature on or off such that the user may view the digital poster in any suitable manner together with the signature or without the signature in a graphical user interface.

In certain examples, system 100 may collect analytics information associated with use of digital assets. Such analytics information may include anonymous data from digital asset transactions performed according to principles described herein. The analytics information may be used in any suitable manner as may serve a particular implementation. For example, the collected analytics information may be used to provide advertisements to users, evaluate the effectiveness of promotional items, track popularity of digital assets, evaluate sponsorships, and/or for any other suitable purpose.

FIGS. 7-9 illustrate exemplary implementations 702, 802, and 902 of metadata that may be generated by system 100 as a specification for a layered scene. Implementations 702, 802, and 902 may adhere to any suitable data format as may serve a particular implementation. FIGS. 7-9 show exemplary data fields that may be used to define metadata associated with a layered scene. A brief description of each of the fields shown in FIGS. 7-9 will now be provided.

The fields associated with "Series" in FIG. 7 include a "SeriesID" that corresponds to an identifier for a layered scene, a "type" of the scene (e.g., layered), and "PrimeTokenIDs" for each non-fungible digital asset (e.g., PToken1, PToken2, etc.) included as part of a set of collectible non-fungible digital assets that makes up the layered scene.

In certain examples, a "PrimeTokenID" may be subject to a template function that facilitates replicating a particular non-fungible digital asset and defining a rarity of the particular non-fungible digital asset. For example, the particular non-fungible digital asset may be replicated one thousand times such that the rarity is 1/1000.

The fields associated with "Tokens" in FIG. 7 define "Objects" for each of the non-fungible digital assets identified by the token ids. For example, PToken1 includes "objectA," PToken2 includes "objectB," etc.

The fields associated with "Objects" in FIG. 8 define attributes of each of the objects listed in FIG. 7. For example, "object A" is defined as a 3D object, and the "map type," "level" (e.g., which layer), "dimensions," "snap position" (e.g., magnetic position), "orientations," and "scale" are defined for each of the objects.

FIG. 9 shows an alternative implementation 902 in which layer attributes for a layered scene are defined together with each respective PrimeTokenID instead of as object metadata.

Figure 10:
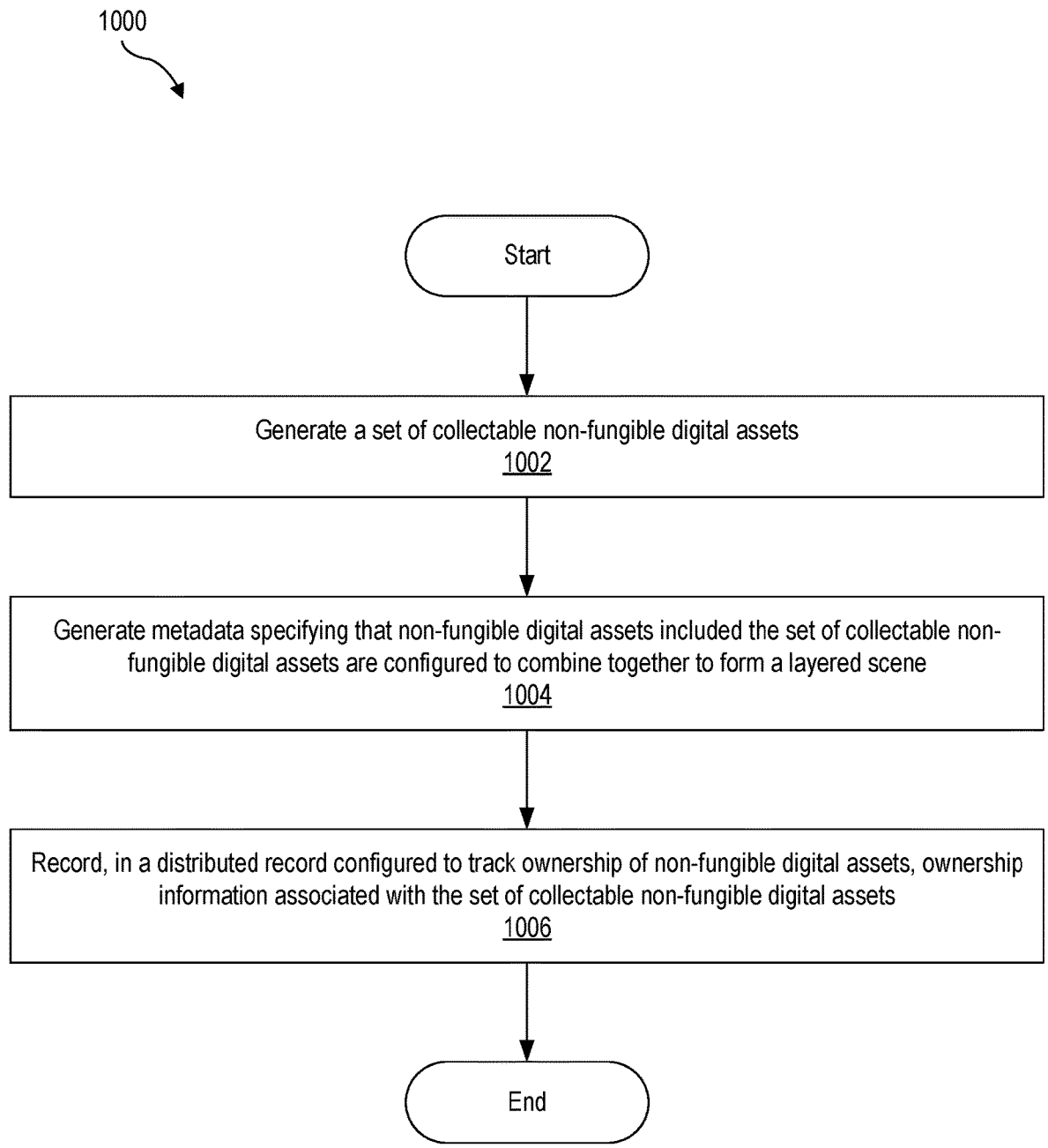
FIGS. 10-11 illustrate exemplary methods for digital asset management according to principles described herein.

FIG. 10 illustrates an exemplary method 1000 for digital asset management. While FIG. 10 illustrates exemplary operations according to one embodiment, other embodiments may omit, add to, reorder, and/or modify any of the operations shown in FIG. 10. One or more of the operations shown in FIG. 10 may be performed by system 100, any components included therein, and/or any implementation thereof.

At operation 1002, a digital asset management system (e.g., digital asset management system 100) may generate a set of collectible non-fungible digital assets. Operation 1002 may be performed in any of the ways described herein.

At operation 1004, the digital asset management system may generate metadata specifying that non-fungible digital assets included in the set of collectible non-fungible digital assets are configured to combine together to form a layered scene configured to be presented by a computer system. Operation 1004 may be performed in any of the ways described herein.

At operation 1006, the digital asset management system may record, in a distributed record configured to track ownership of non-fungible digital assets, ownership information associated with the set of collectible non-fungible digital assets. Operation 1006 may be performed in any of the ways described herein.

Figure 11:
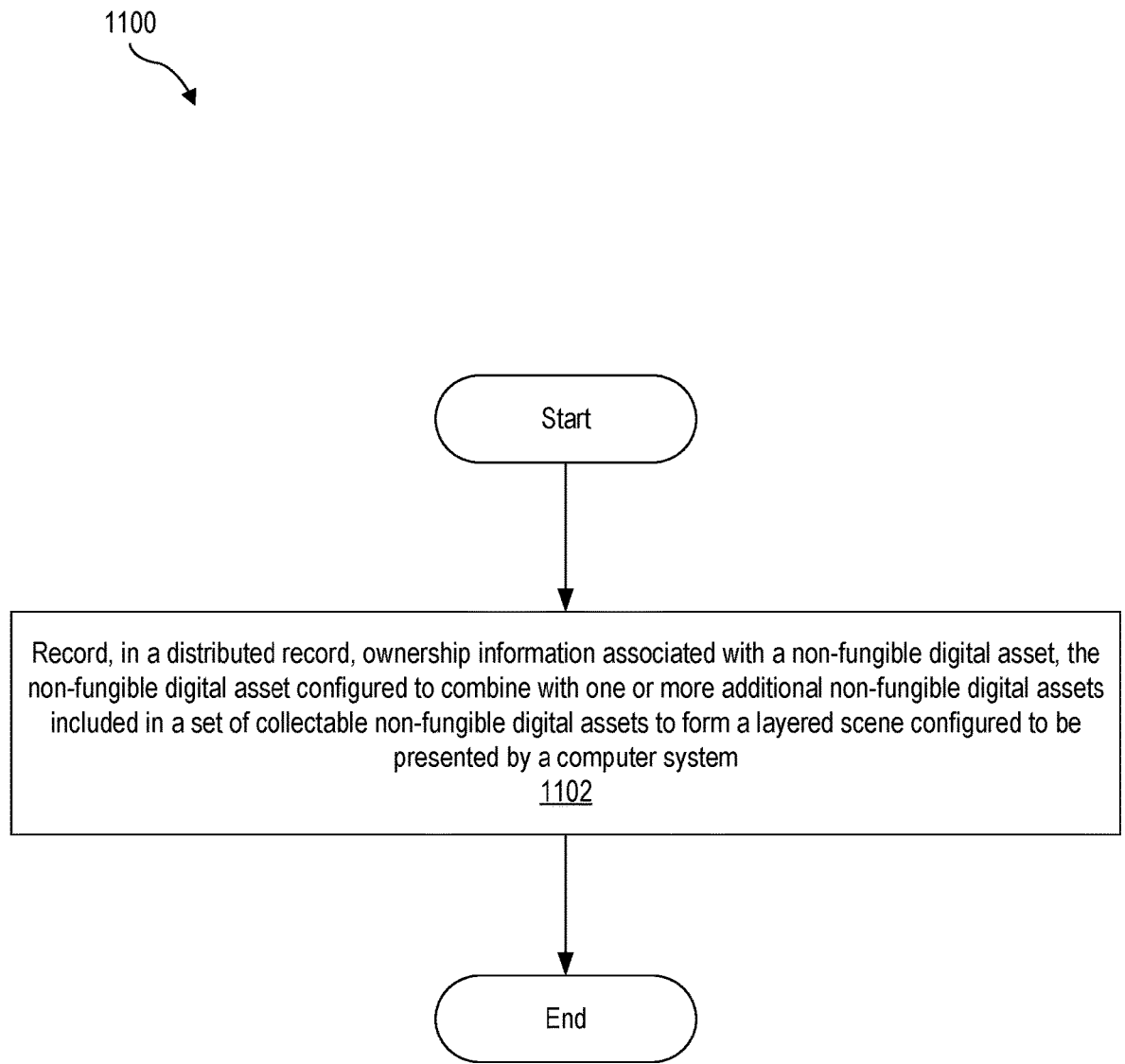

FIG. 11 illustrates another exemplary method 1100 for digital asset management. While FIG. 11 illustrates an exemplary operation according to one embodiment, other embodiments may add to and/or modify the operation shown in FIG. 11. The operation shown in FIG. 11 may be performed by system 100, any components included therein, and/or any implementation thereof.

At operation 1102, a digital asset management system (e.g., digital asset management system 100) may record, in a distributed record configured to track ownership of non-fungible digital assets, ownership information associated with a non-fungible digital asset. As described herein, the non-fungible digital asset may be configured to combine with one or more additional non-fungible digital assets included in a set of collectible non-fungible digital assets to form a layered scene configured to be presented by a computer system. Operation 1102 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory (RAM), and an optical disc (e.g., a compact disc, a digital video disc, a Blu-ray disc, etc.). Exemplary volatile storage media include, but are not limited to, RAM (e.g., dynamic RAM).

Figure 12:
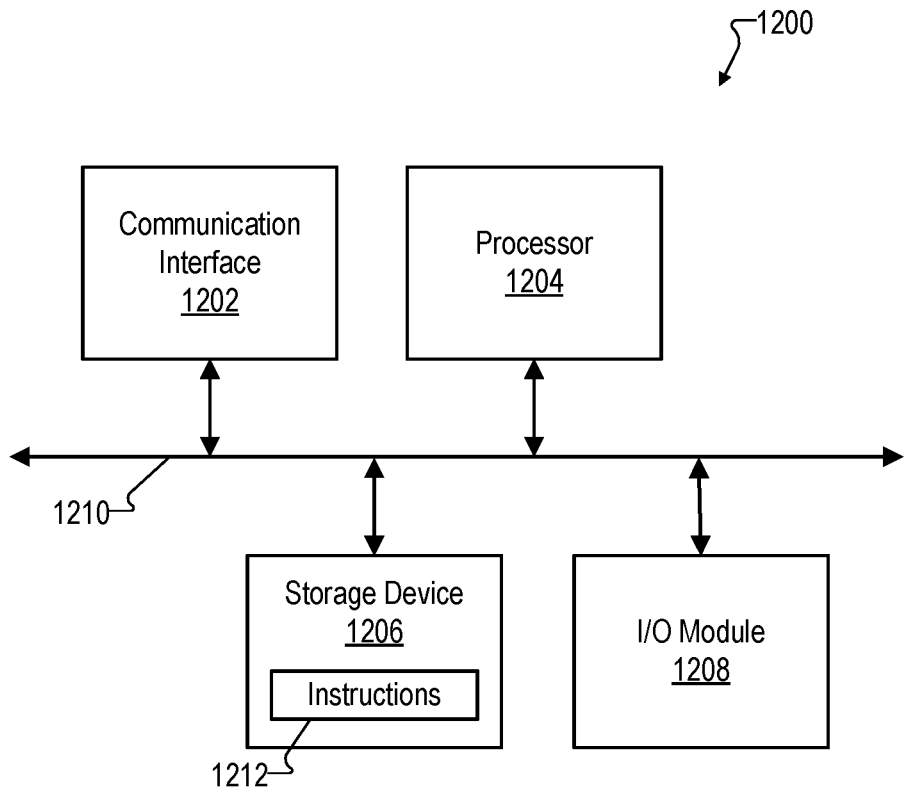
FIG. 12 illustrates an exemplary computing device according to principles described herein.

FIG. 12 illustrates an exemplary computing device 1200 that may be specifically configured to perform one or more of the processes described herein. As shown in FIG. 12, computing device 1200 may include a communication interface 1202, a processor 1204, a storage device 1206, and an input/output (I/O) module 1208 communicatively connected one to another via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, an audio/video connection, and any other suitable interface.

Processor 1204 generally represents any type or form of processing unit capable of processing data and/or interpreting, executing, and/or directing execution of one or more of the instructions, processes, and/or operations described herein. Processor 1204 may perform operations by executing computer-executable instructions 1212 (e.g., an application, software, code, and/or other executable data instance) stored in storage device 1206.

Storage device 1206 may include one or more data storage media, devices, or configurations and may employ any type, form, and combination of data storage media and/or device. For example, storage device 1206 may include, but is not limited to, any combination of the non-volatile media and/or volatile media described herein. Electronic data, including data described herein, may be temporarily and/or permanently stored in storage device 1206. For example, data representative of computer-executable instructions 1212 configured to direct processor 1204 to perform any of the operations described herein may be stored within storage device 1206. In some examples, data may be arranged in one or more databases residing within storage device 1206.

I/O module 1208 may include one or more I/O modules configured to receive user input and provide user output. One or more I/O modules may be used to receive input for a virtual experience. I/O module 1208 may include any hardware, firmware, software, or combination thereof supportive of input and output capabilities. For example, I/O module 1208 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 1200. For example, memory 102 may be implemented by storage device 1206, and processor 104 may be implemented by processor 1204.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
generating, by a digital asset management system, a set of collectible non-fungible digital assets;

generating, by the digital asset management system, metadata specifying that non-fungible digital assets included the set of collectible non-fungible digital assets are configured to combine together to form a layered scene configured to be presented by a computer system;

recording, by the digital asset management system in a distributed record configured to track ownership of non-fungible digital assets, ownership information associated with the set of collectible non-fungible digital assets, the ownership information indicating that a user of the computer system owns a first non-fungible digital asset and a second non-fungible digital asset that are each included in the set of collectible non-fungible digital assets;

generating, by the digital asset management system based on the metadata and the ownership information, the layered scene for presentation by the computer system to the user, the layered scene including the first and second non-fungible digital assets combined together to form the layered scene; and wherein the digital asset management system is implemented using at least one processor and a memory.

2. The method of claim 1, wherein the generating of the set of collectible non-fungible digital assets includes:
generating a base layer non-fungible digital asset; and
generating one or more additional non-fungible digital assets that are configured to combine with the base layer non-fungible digital asset to form the layered scene.

3. The method of claim 2, wherein the metadata includes information specifying that the one or more additional non-fungible digital assets are each configured to be located at a predefined position with respect to the base layer non-fungible digital asset when combined with the base layer non-fungible digital asset.

4. The method of claim 2, wherein at least some of the one or more additional non-fungible digital assets are configured to be located at a user selected position with respect to the base layer non-fungible digital asset when combined with the base layer non-fungible digital asset.

5. The method of claim 1, further comprising transmitting, by the digital asset management system, one or more non-fungible digital assets included in the set of collectible non-fungible digital assets to the computer system.

6. The method of claim 1, further comprising recording, by the digital asset management system, the metadata in the distributed record.

7. The method of claim 1, wherein:
the metadata includes rendering rules for combining layers of the layered scene; and
the method further comprises generating, by the digital asset management system, the layered scene based on the rendering rules included in the metadata.

8. A method comprising:
recording, by a digital asset management system and in a distributed record configured to track ownership of non-fungible digital assets, ownership information associated with a non-fungible digital asset that is part of a set of collectible non-fungible digital assets;
recording, by the digital asset management system and in the distributed record, additional ownership information associated with an additional non-fungible digital asset included in the set of collectible non-fungible digital assets;
generating, by the digital asset management system based on metadata associated with the set of collectible non-fungible digital assets, the ownership information, and the additional ownership information, a layered scene for presentation by a computer system, the layered scene including the non-fungible digital asset and the additional non-fungible digital asset combined together to form the layered scene; and wherein the digital asset management system is implemented using at least one processor and a memory.

9. The method of claim 8, wherein the additional non-fungible digital asset is configured, based on the metadata, to be located at a predefined position with respect to the non-fungible digital asset.

10. The method of claim 9, further comprising facilitating, by the digital asset management system, the additional non-fungible digital asset assuming the predefined position with respect to the non-fungible digital asset.

11. The method of claim 8, wherein at least some non-fungible digital assets included in the set of collectible non-fungible digital assets are configured, based on the metadata, to be provided on a same layer of the layered scene.

12. The method of claim 8, wherein each non-fungible digital asset included in the set of collectible non-fungible digital assets is configured, based on the metadata, to be provided on a different layer of the layered scene.

13. The method of claim 8, wherein the non-fungible digital asset and the additional non-fungible digital asset included in the set of collectible non-fungible digital assets are reversibly combinable together.

14. The method of claim 8, wherein the non-fungible digital asset includes at least one of a two-dimensional image, a three-dimensional image, an audio clip, an animation, or a visual effect.

15. The method of claim 8, further comprising:
determining, by the digital asset management system, that a user of the computer system does not currently own at least some non-fungible digital assets included in the set of collectible non-fungible digital assets; and
providing, by the digital asset management system to the user of the computer system, a notification indicating which of the at least some non-fungible digital assets the user does not currently own.

16. The method of claim 8, wherein the layered scene is at least one of a two-dimensional layered scene, a static layered scene, a moving layered scene, a three-dimensional layered scene, or an augmented reality layered scene.

17. A system comprising:
a memory storing instructions; and
a processor configured to execute the instructions to
record, in a distributed record configured to track ownership of non-fungible digital assets, ownership information associated with a non-fungible digital asset that is part of a set of collectible non-fungible digital assets;
record, in the distributed record, additional ownership information associated with an additional non-fungible digital asset included in the set of collectible non-fungible digital assets; and
generate, based on metadata associated with the set of collectible non-fungible digital assets, the ownership information, and the additional ownership information, a layered scene for presentation by a computer system to a user, the layered scene including the non-fungible digital asset and the additional non-fungible digital asset combined together to form the layered scene.

* * * * *